Figure 1:
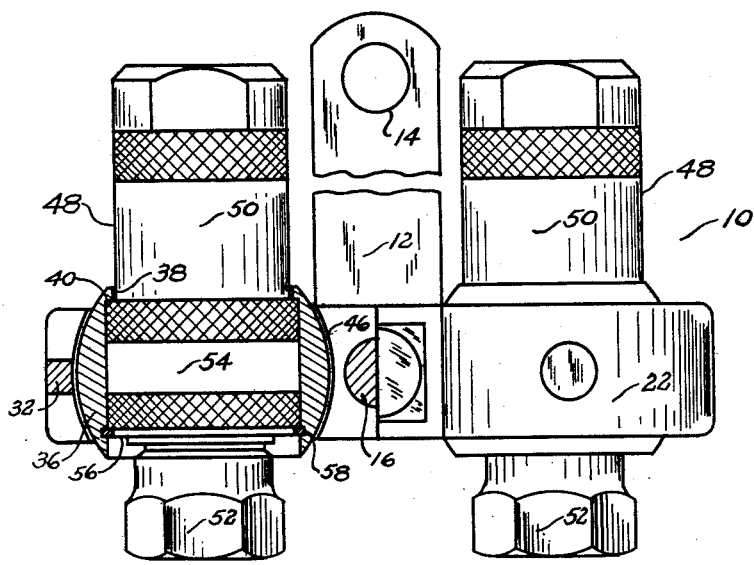

March 17, 1964  M. G. CHARLES  3,125,359
PUSH-PULL BREAKAWAY COUPLING
Filed Jan. 28, 1959

INVENTOR
Maynard G. Charles
BY Beaman & Beaman
ATTORNEY

United States Patent Office 3,125,359
Patented Mar. 17, 1964

3,125,359
PUSH-PULL BREAKAWAY COUPLING
Maynard G. Charles, Napoleon, Mich., assignor to Aeroquip Corporation, Jackson, Mich., a corporation of Michigan
Filed Jan. 28, 1959, Ser. No. 789,652
1 Claim. (Cl. 285—62)

The present invention relates to improvements in mounting frame for fluid couplings, being particularly adapted to breakaway couplings used between tractors and trailing equipment.

In recent years actuation of farm implements by hydraulic pressure has become wide spread. As the pressure employed is developed by and controlled from the tractor, connection and disconnection of the tools from the tractor, overload releases, sharp turns, and irregular terrain all present problems in the mounting and support of the couplings.

According to the invention, a mounting frame for couplings has been provided which is especially designed for breakaway couplings. The frame is inexpensive to fabricate, rugged in construction and adapted for use under operating conditions experienced in farm work. Couplings when mounted in the frame can swing in any direction. In this manner side thrust as a source of coupling wear and leakage is substantially eliminated since the coupling is able to align itself parallel to the pull.

Thus, an object of the invention is to provide an improved mounting frame for couplings which possesses the above mentioned advantages.

Another object is to provide a mounting frame for breakaway couplings which possesses the above mentioned advantages.

A further object is to provide a mounting frame for swiveling a flexible fluid conduit consisting of an attachment part carrying two similar swivel frame parts which removably embrace a pair of similar swivel parts; the swivel frame parts and swivel parts being held in assembly by a single fastener.

These and other objects and advantages residing in the combination, structure and arrangement of component parts of the mounting frame will more fully appear from the following detailed description and the appended claim.

Figure 4:
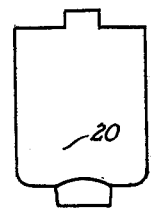
Figure 2:
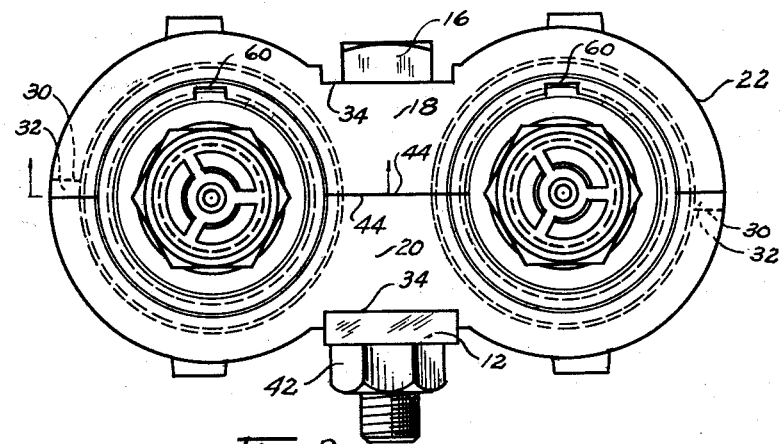
Figure 5:
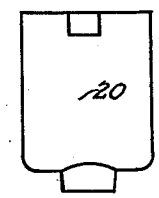
Figure 3:
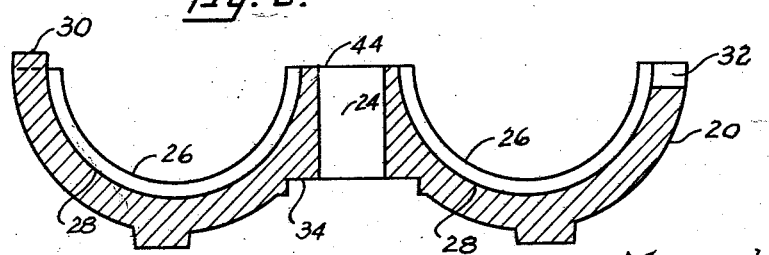

In the drawings,

FIG. 1 is a plan view, partially shown in cross section, of the mounting frame showing a pair of self-sealing breakaway couplings in position, FIG. 2 is a front elevation of FIG. 1, FIG. 3 is a cross-sectional view of one part of the yoke, and FIGS. 4 and 5 are end views of the part of FIG. 3 taken from opposite ends.

Referring to the illustarted form of the invention, the mounting frame, generally designated 10, consists of an attachment member 12 having a hole 14 at one end to receive a bolt or other form of fastener to secure the member to a part of the tractor. A similar hole (not shown), is provided at the opposite end of the member 12 to receive the bolt 16 employed to clamp the parts 18 and 20 of the yoke-shaped swivel frame 22.

The parts 18 and 20 are preferably identical, in practice being die cast in the same cavity to reduce the cost of tooling. As shown in FIG. 3, each part 18 and 20 consists of a cast body having a hole 24, to receive the bolt 16, a pair of semi-circular openings 26, spherical interior walls 28, a tongue 30 on end and a groove 32 on the opposite end. When a pair of identical parts 18 and 20 are reversed end for end and associated as shown in FIG. 2, the tongue 30 of the part 18 will enter the groove 32 of the part 20 and vice versa. This aligns the parts 18 and 20 and prevents any lateral shifting relative to each other when clamped together by the bolt 16. A recess 34 in the outer surface of each part 18 and 20 is provided to receive the member 12 to prevent relative rotation of the swivel frame 22 relative to the member 12.

Located in each spherical socket defined by the spherical surfaces 28 are swivel ball parts 36, preferably of one piece die cast construction having a central aperture 38 which is counter bored to provide a shoulder 40. The parts 36 have sufficient clearance in the spherical sockets of the swivel frame 22 to freely swivel therein in all directions. When the nut 42 on the bolt 16 is fully tightened with the faces 44 of the parts 18 and 20 in stressed abutment, the clearance 46 between the ball parts 36 in the sockets of the swivel frame 22 is still maintained. Clearance 46 is also adequate to prevent the ball parts 36 from freezing in their sockets due to normal dirt and corrosion experienced in use.

As shown in FIGS. 1 and 2, the fluid coupling units 48 are of a self-sealing breakaway type consisting of separable parts 50 and 52 to which the flexible hose lines (not shown) are attached. The part 50, which is attached to the flexible hose extending to the fluid pressure pump on the tractor, has a barrel portion 54 which is inserted into the ball part 36 to abut the shoulder 40. A snap ring 56, engaging in an annular groove 58 in the part 36, retains the part 50 and the ball part 36 in unitary relation, with the unit thus formed having, in practice, a 30° swivel in all directions. Access to the snap ring 56 to remove the same is provided by the axial groove 60.

Having thus described my invention, what I claim is new and desire to protect by Letters Patent is:

In combination, a pair of self-contained detachable hose couplings, each having an external cylindrical barrel portion extending radially outwardly therefrom and providing spaced annular shoulders, mounting means for securing said couplings to a supporting structure comprising mating first and second holding members having cooperating interlocking portions, said members being substantially identical halves and containing first and second semi-spherical companion sockets, said holding members having a recess defined by opposed shoulders formed externally of and intermediate said first and second socket halves thereof, first and second semi-spherical ball socket members rotatably retained in said first and second sockets, respectively, said ball socket members each having a cylindrical opening extending therethrough with abutment means adjacent one end of said cylindrical opening, said cylindrical barrel portion of each of said couplings being disposed within one of said cylindrical openings wherein one of the annular shoulders on each of said barrel portions engages one of said abutment means, first and second releasable fastening means on said first and second ball socket members respectively engaging the other annular shoulders of said external cylindrical portions and securing each of said couplings within one of said cylindrical openings, an attachment member disposed in said recess in one of said holding members and engaging said opposed shoulders to thereby non-rotatably engage said one holding member, and a single fastening means extending through said holding members and said attachment member for securing the above parts together, whereby said hose couplings are held in said sockets in a substantially universal coupling.

(References on following page)

References Cited in the file of this patent

UNITED STATES PATENTS

| | | |
|---|---|---|
| 783,301 | McMillan | Feb. 21, 1905 |
| 1,437,372 | Walters | Nov. 29, 1922 |
| 2,354,919 | Lockwood | Aug. 1, 1944 |
| 2,359,835 | Ford | Oct. 10, 1944 |
| 2,393,203 | Tarbell et al. | Jan. 15, 1946 |
| 2,526,045 | Riemann | Oct. 17, 1950 |
| 2,538,259 | Merriman | Jan. 16, 1951 |
| 2,649,314 | Richardson | Aug. 18, 1953 |
| 2,652,221 | Kampa | Sept. 15, 1953 |
| 2,666,656 | Bruning | Jan. 19, 1954 |
| 2,809,067 | Morin | June 9, 1959 |
| 2,930,633 | Ethington | Mar. 29, 1960 |
| 2,937,835 | Csmereka | May 24, 1960 |

FOREIGN PATENTS

| | | |
|---|---|---|
| 544,618 | Great Britain | Apr. 21, 1942 |